(12) United States Patent
Spalton

(10) Patent No.: US 7,784,260 B2
(45) Date of Patent: Aug. 31, 2010

(54) SHAFT COUPLING

(75) Inventor: Martin C. Spalton, Derby (GB)

(73) Assignee: Rolls-Royce plc, London (GB)

( * ) Notice: Subject to any disclaimer, the term of this patent is extended or adjusted under 35 U.S.C. 154(b) by 184 days.

(21) Appl. No.: 12/078,951

(22) Filed: Apr. 8, 2008

(65) Prior Publication Data

US 2008/0271969 A1    Nov. 6, 2008

(30) Foreign Application Priority Data

May 3, 2007  (GB)  ................................. 0708533.5

(51) Int. Cl.
*F02C 1/06*  (2006.01)
(52) U.S. Cl. .................. 60/39.163; 415/122.1
(58) Field of Classification Search .............. 60/791, 60/792, 39.163; 415/122.1, 124.2; 416/169 R, 416/197 C, 180
See application file for complete search history.

(56) References Cited

U.S. PATENT DOCUMENTS 3,880,547 A  *  4/1975  Hagen .................. 60/791

* cited by examiner

*Primary Examiner*—Michael Cuff
*Assistant Examiner*—Vikansha S Dwivedi
(74) *Attorney, Agent, or Firm*—Oliff & Berridge, PLC

(57) ABSTRACT

A shaft coupling device to couple first and second shafts, said device comprising a fluid coupling having a first portion attached to the first shaft and a second portion attached to the second shaft wherein the device further comprises engagement means operable to switch the device between an engaged position and a disengaged position, the engaged position having each of the first and second shafts engaged with its respective portion of the fluid coupling and the disengaged position having at least one of the first and second shafts disengaged from its respective portion of the fluid coupling.

9 Claims, 3 Drawing Sheets

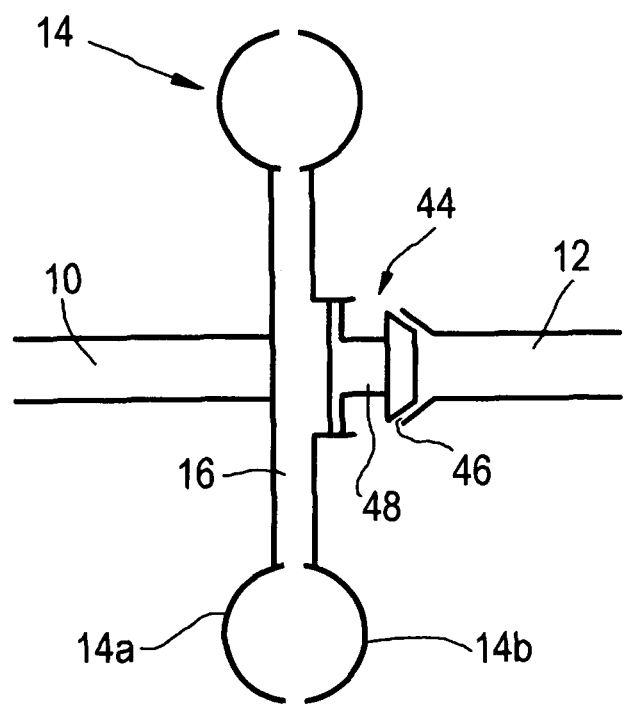
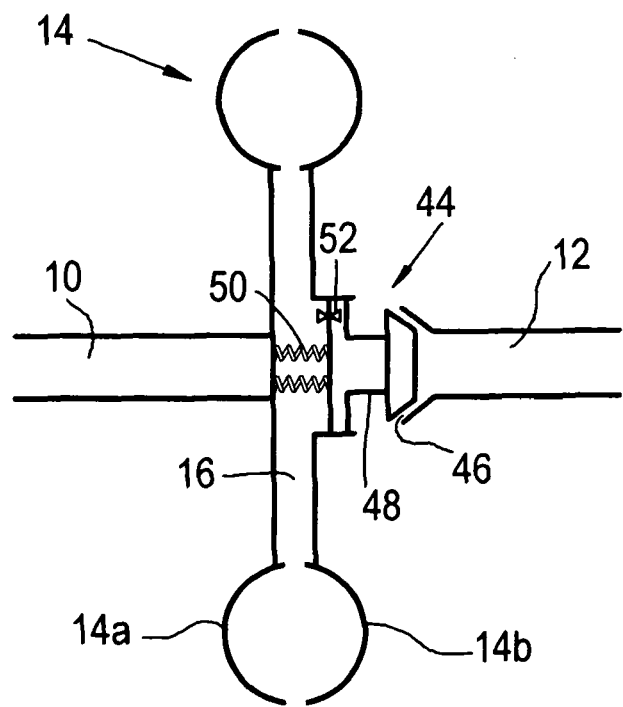

SHAFT COUPLING

BACKGROUND

The present invention relates to shaft coupling and is particularly concerned with the temporary coupling of shafts using fluid coupling. It finds particular applications in gas turbine engines where shafts may be rotating at very different speeds but may equally find utility in other applications.

It is commonplace in gas turbine engines used for aircraft propulsion to remove power from a shaft of an engine during flight to drive aircraft systems and accessories including cabin systems, in-flight entertainment systems and cabin air pressurisation systems. In a three-shaft gas turbine engine it is known to take power from the high pressure (HP) shaft. Since more power is usually available from the intermediate pressure (IP) shaft than the HP shaft, it is beneficial to take power from the IP shaft, particularly during engine descent, and hence reduce fuel consumption compared to the condition if power is taken from the HP shaft. There is a consequent reduction in the amount of fuel required for a flight and thus the cost of that flight. However, there is a requirement to drive the high pressure compressor during engine starting meaning it may be desirable to transfer starting torque from the IP to the HP shaft. Furthermore, under high power off-take conditions when the engine is at idle it may be necessary to transfer power from the HP to the IP shaft. Therefore, there may be a need to couple the high pressure and intermediate pressure shafts for some periods in the engine cycle.

A conventional method of temporarily coupling two shafts is to use fluid coupling. A typical arrangement is shown in FIG. 1 in which a first, intermediate pressure shaft 10 and a second, high pressure shaft 12 are coupled by fluid couplings 14. Typically the fluid couplings 14 comprise two or more ball chambers annularly arrayed around the ends of shafts 10, 12. The chambers 14 are linked by fluid passages 16 so that the working fluid, for example oil, can be distributed into and between the chambers 14 or removed from them. Each chamber 14 and the associated passages 16 is formed in two sections, connected to the IP and HP shafts 10, 12 respectively. When the chambers 14 and passages 16 are filled with oil the two sections of the chambers 14a, 14b are compelled to rotate in approximate synchronicity and thus the shafts 10, 12 are coupled. When decoupling is required, the oil is drained from the chambers 14 and passages 16 so that the two sections are no longer constrained to rotate together but are free to rotate in synchronicity with their respective shafts, which may be rotating at different speeds. Hence the two sections of each chamber 14 rotate independently at different speeds to each other.

SUMMARY

One disadvantage of this method is that the air that fills the chambers to replace the oil causes frictional drag between the two sections of each chamber 14a, 14b and thereby generates waste heat energy. The amount of waste heat generated is proportional to the difference in shaft speeds and, therefore, at large shaft speed differentials such as those experienced in gas turbine engine applications, the heat losses are very large. Hence, the chambers 14 may have undesirable life limitations and the oil be degraded as a result of this waste heat. This has a consequent effect on safety and reliability, and on engine maintenance timescales.

The present invention seeks to provide an improved shaft coupling device that seeks to address the above mentioned problems.

Accordingly the present invention provides a shaft coupling device to couple first and second shafts, said device comprising a fluid coupling having a first portion attached to the first shaft and a second portion attached to the second shaft wherein the device further comprises engagement means operable to switch the device between an engaged position and a disengaged position, the engaged position having each of the first and second shafts engaged with its respective portion of the fluid coupling and the disengaged position having at least one of the first and second shafts disengaged from its respective portion of the fluid coupling.

Preferably at least one of the first and second shafts is engaged by a gear arrangement. Preferably the gear arrangement is a synchromesh gear arrangement.

Preferably the engagement means is a hydraulic piston. Preferably the hydraulic piston switches the shaft coupling device to the engaged position by fluid pressure.

Preferably the shaft coupling device is biased to the disengaged position by at least one tension spring. Alternatively it may be biased to the disengaged position by fluid pressure.

Preferably the first and second shafts are shafts of a gas turbine engine. More preferably the first shaft is an intermediate pressure shaft of a three-shaft gas turbine engine and the second shaft is a high pressure shaft of a three-shaft gas turbine engine.

The present invention also provides a gas turbine engine provided with a shaft coupling device as described in any of the previous five paragraphs.

BRIEF DESCRIPTION OF THE DRAWINGS

The present invention will be more fully described by way of example with reference to the accompanying drawings, in which:

FIG. 3 is a schematic drawing of a shaft coupling device according to the present invention.

FIG. 4 is a more detailed schematic view of the shaft coupling device of FIG. 3.

DETAILED DESCRIPTION OF EMBODIMENTS

Figure 1:
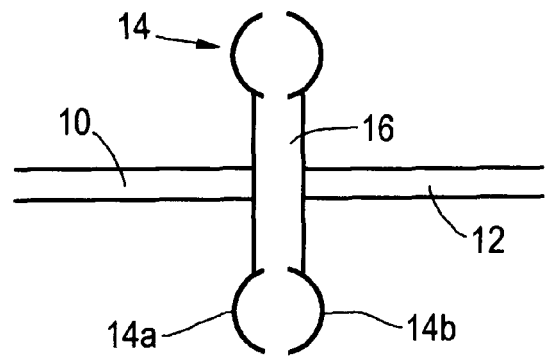
FIG. 1 is a schematic drawing of a related art coupling device.
Figure 2:
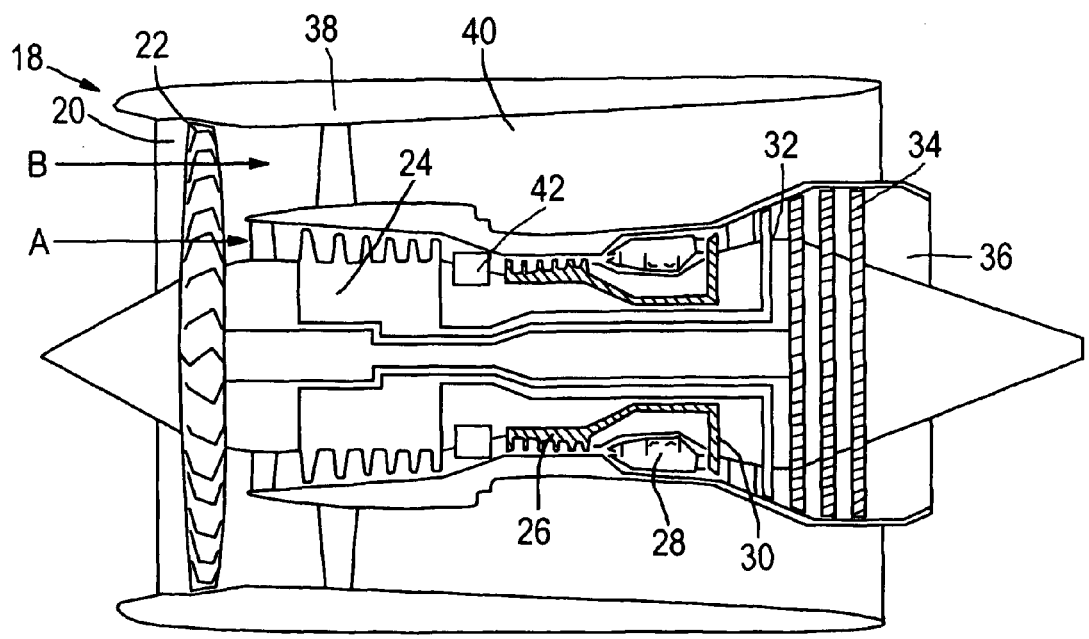
FIG. 2 is a schematic sectional side view of a gas turbine engine that incorporates a shaft coupling device in accordance with the present invention.

A gas turbine engine 18 is shown in FIG. 2 and comprises an air intake 20 and a propulsive fan 22 that generates two coaxial airflows A and B. The gas turbine engine 18 comprises, in radially inner axial flow A, an intermediate pressure compressor 24, a high pressure compressor 26, a combustor 28, a high pressure turbine 30, an intermediate pressure turbine 32, a low pressure turbine 34 and an exhaust nozzle 36. A nacelle 38 surrounds the gas turbine engine 18 and defines, in radially outer axial flow B, a bypass duct 40. A step-aside gear box 42 comprising shaft coupling for starting and power off-take is located between the intermediate pressure compressor 24 and the high pressure compressor 26 and may comprise an accessory drive shaft output for power off-take and engine starting components (not shown).

An exemplary embodiment of the present invention is shown in FIG. 3 in which the intermediate pressure shaft 10 and the high pressure shaft 12 are coupled by a shaft coupling device according to the present invention. The IP shaft 10 terminates in a section defining part of fluid passages 16 leading to a first half of fluid coupling 14a. The HP shaft 12 is selectively engaged with a section defining a second part of the fluid passages 16 and a second half of the fluid coupling 14b. Engagement means 44 are provided to switch the shaft coupling device between engaged and disengaged positions. The engagement means 44 comprises a synchromesh gear arrangement 46, provided to connect the IP shaft to the second half of the fluid coupling 14b, and a hydraulic piston 48 that engages the gear arrangement 46 by overcoming a biasing force that biases the gear arrangement 46 towards the disengaged position. In operation working fluid, oil, is pumped into or against the hydraulic piston 48 from a source, through ducts and a pump that are external to the present invention and are omitted from the figure for clarity.

The hydraulic piston 48 acts to bring the synchromesh gear 46 into engagement and thereby engage the HP shaft 12 to the section defining the fluid passages 16 and therefore the second half of the fluid coupling 14b. As can be seen in the more detailed view of FIG. 4, a fluid flow valve 52 provides fluid communication between the hydraulic piston 48 and the fluid passages 16 and fluid coupling 14. Once the synchromesh gear 46 is engaged, the fluid flow valve 52 is opened to allow the oil to flow into the fluid coupling 14 and thus couple the IP and HP shafts 10, 12.

To decouple the IP and HP shafts 10, 12 it is necessary to decouple the fluid coupling 14 by draining the oil from them. This may be via drain means (not shown) or natural spillage resulting from the pressure loss experienced when the oil supply is removed. The flow valve 52 is subsequently shut. The present invention benefits from a substantial reduction in waste heat caused by air drag between the two shafts 10, 12 when in the decoupled position by also disengaging the HP shaft 12 from the fluid passages 16 and fluid coupling 14. Tension springs 50, shown in FIG. 4, act to return the hydraulic piston 48 and synchromesh gear 46 to the disengaged position thereby disengaging the HP shaft 12 from the fluid coupling 14.

In the decoupled position the first half of the fluid coupling 14a rotates with the IP shaft 10 and the second half of the fluid coupling 14b is free to rotate as it is disengaged from both shafts. Air, which fills the fluid coupling 14 when the oil is removed, provides a frictional force on the second half of the fluid coupling 14b caused by the movement of the first half 14a. Since the second half 14b is disengaged from the HP shaft 12, the frictional force acting upon it drags it to rotate in approximate synchronicity with the first half 14a. Thus there is little or no speed differential between the two halves of the fluid coupling 14 and consequently little waste heat generated.

Figure 5:
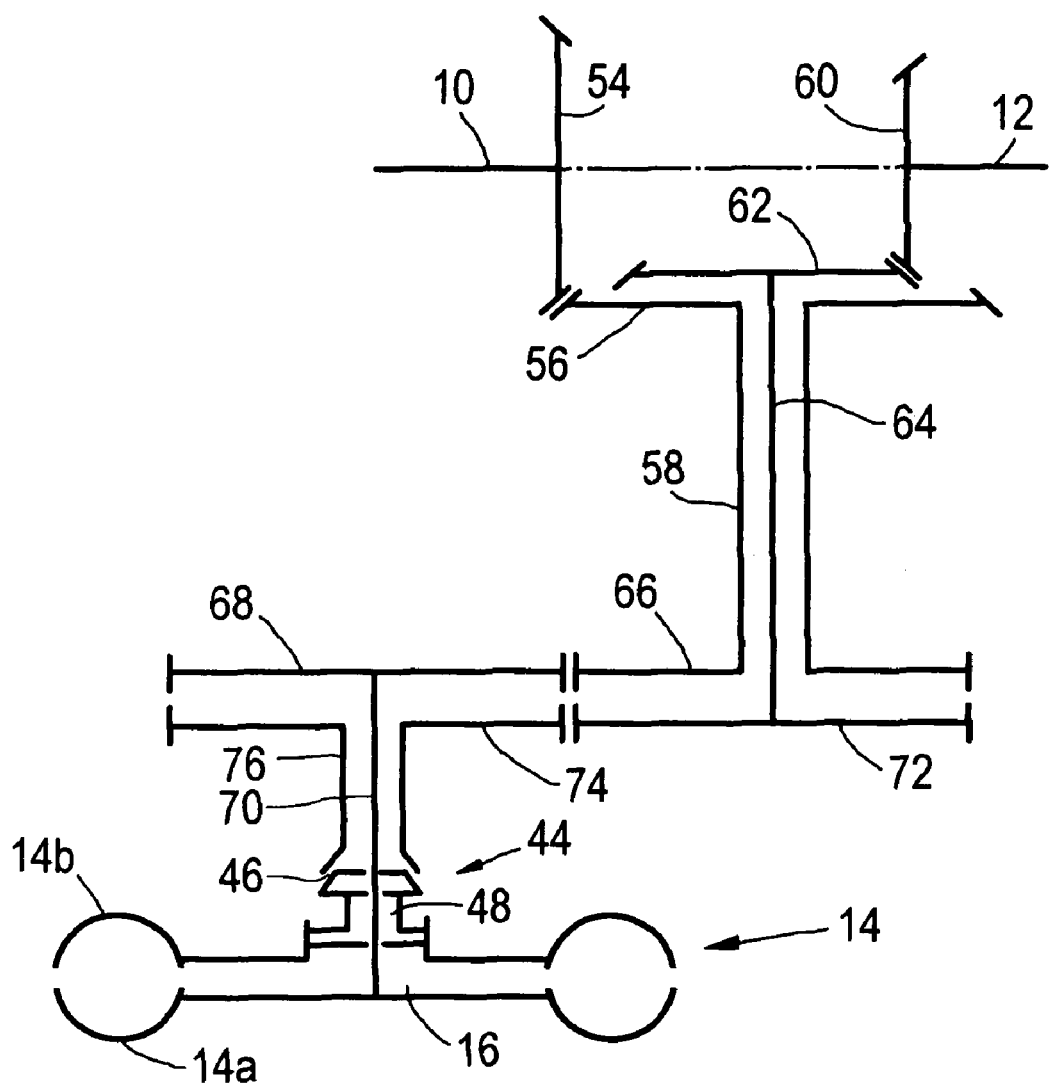
FIG. 5 is a schematic drawing of a step-aside gear box of a gas turbine engine incorporating a shaft coupling device according to the present invention.

FIG. 5 shows a step-aside gearbox, such as may be found in a gas turbine engine, including a shaft coupling device according to the present invention that couples the intermediate pressure shaft 10 and the high pressure shaft 12. The IP shaft 10 comprises a gear 54 perpendicularly at its end that meshes with another gear 56 perpendicularly at one end of a shaft 58, the shaft 58 being perpendicular to the IP shaft 10. Similarly, the HP shaft 12 comprises a gear 60 perpendicularly at its end that meshes with another gear 62 perpendicularly at one end of a shaft 64, the shaft 64 being coaxial with shaft 58. Shaft 58 has, at its opposite end to gear 56, a gear 66 that meshes with a gear 68 at one end of a shaft 70 such that shaft 70 is in the same alignment as shaft 58 but is offset by the radius of gears 64 and 68. Similarly, shaft 64 has, at its opposite end to gear 62, a gear 72 that meshes with a gear 74 at one end of a shaft 76. Shaft 76 is coaxial with shaft 70. Shaft 70 is connected to a section defining part of the fluid passages 16 and thence to the first half of the fluid coupling 14a. Shaft 76 is connected via engagement means 44, comprising the synchromesh gear 46 and hydraulic piston 48, to a section defining part of the fluid passages 16 and thence to the second half of the fluid coupling 14b. Hence the IP shaft 10 is connected, via gears 54, 56, 66, 68 and shafts 58, 70, to the first half of the fluid coupling 14a and the HP shaft 12 is connected, via gears 60, 62, 72, 74, shafts 64, 76 and the engagement means 44, to the second half of the fluid coupling 14b.

The gear arrangement 46 has been described as a synchromesh gear. However, any suitable alternative may be used to derive the benefits of the present invention without prejudice. Although the apparatus for engaging and disengaging the gear 46 has been described as a hydraulic piston 48 and two tension springs 50 other arrangements may be envisaged by the skilled reader within the scope of the invention claimed. For example, the hydraulic piston may be a dual-state piston which is hydraulically activated to either of its two extents. Alternatively, the engagement means may comprise, for example, a ratchet clutch. A single tension spring could be used or more than two tension springs. Alternatively another method of biasing the piston to the disengaged position could be used.

The working fluid has been described as oil. However, any suitable working fluid can be substituted.

The fluid flow valve for directing oil into the fluid coupling 14 and passages 16 has been described as a separate valve 52. However, other suitable arrangements are possible. For example, the piston may cover one or more apertures in the shaft wall in the disengaged position but leave it uncovered when it moves to the engaged position to allow fluid to flow into the coupling. Alternatively, a sliding plate may cover one or more apertures in the shaft wall and be moved by the movement of the piston, an independent control signal or a combination of these.

The engagement means 44 has been described in relation to the HP shaft 12. However, it is equally appropriate to provide the engagement means 44 on the IP shaft 10 and keep the HP shaft 12 permanently connected to the fluid coupling 14. Alternatively, both shafts 10, 12 may be disengaged from their respective halves of the fluid coupling 14. Although the present invention has been described to couple the IP and HP shafts, alternatively the low pressure shaft could be coupled to the intermediate or high pressure shafts. Further, although the present invention has been described with reference to a three-shaft gas turbine engine it is equally applicable to a two-shaft engine.

The present invention could equally be used to temporarily couple shafts in fields other than gas turbine engines, including coaxial shafts.

The invention claimed is:

1. A shaft coupling device to couple first and second shafts, said device comprising a fluid coupling having a first portion attached to the first shaft and a second portion selectively engaged with the second shaft wherein the device further comprises engagement means operable to switch the device between an engaged position and a disengaged position, the engaged position having each of the first and second shafts engaged with its respective portion of the fluid coupling and the disengaged position having at least one of the first and second shafts disengaged from its respective portion of the fluid coupling, the engagement means comprising a synchromesh gear arrangement.

2. A shaft coupling device as claimed in claim 1 wherein the engagement means further comprises a hydraulic piston.

3. A shaft coupling device as claimed in claim 2 wherein the hydraulic piston switches the device to the engaged position by fluid pressure.

4. A shaft coupling device as claimed in claim 1 wherein the device is biased to the disengaged position by at least one tension spring.

5. A shaft coupling device as claimed in claim 1 wherein the device is biased to the disengaged position by fluid pressure.

6. A shaft coupling device as claimed in claim 1 wherein the first and second shafts are shafts of a gas turbine engine.

7. A shaft coupling device as claimed in claim 6 wherein the first shaft is an intermediate pressure shaft of a three-shaft gas turbine engine.

8. A shaft coupling device as claimed in claim 6 wherein the second shaft is a high pressure shaft of a three-shaft gas turbine engine.

9. A gas turbine engine provided with a shaft coupling device as claimed in claim 1.

* * * * *